May 29, 1956 — W. J. BAILEY — 2,747,318
FISH LURE
Filed Oct. 2, 1953

INVENTOR.
William J. Bailey
BY
McMorrow, Berman & Davidson
ATTORNEYS

United States Patent Office 2,747,318
Patented May 29, 1956

2,747,318

FISH LURE

William J. Bailey, Detroit, Mich.

Application October 2, 1953, Serial No. 383,784

1 Claim. (Cl. 43—42.51)

This invention relates to fish lures and more particularly to a device of this character of the trolling spinner type lure.

The object of this invention is to provide an improved spinning lure which due to the peculiar construction of the device will prevent excessive side movement of the hook which would normally be secured to the free end of the spinning lure.

The invention is illustrated in the accompanying drawing in which.

Figure 3:
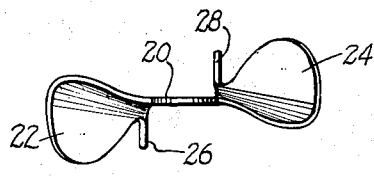
Figure 3 is an end view of the device as viewed from the left in Figure 1.
Figure 4:
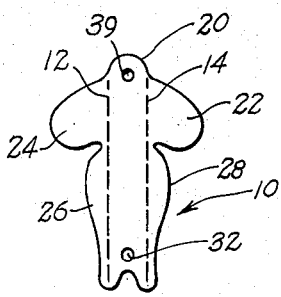
Figure 4 is a plan view of a blank from which the lure is fashioned.
Figure 5:
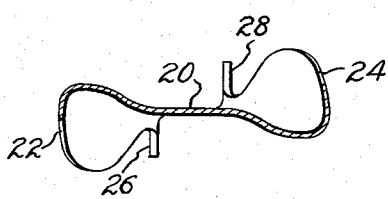
Figure 5 is a cross sectional view taken on line 5—5 of Figure 1.

The blank from which the fish lure of the present invention is formed is generally indicated at 10. This blank may be aluminum or stainless steel or other sheet metal of relatively thin gauge and adaptable to a single stamping operation to form the present device. The blank 10 is bent in opposite directions along the lines 12 and 14 which represent fold lines and shown as broken lines in Figure 4, to form the main body 16 with a flat intermediate body portion defined between the lines 12 and 14, the intermediate body portion having a shank 18 and a head 20. The head 20 has a pair of ears 22 and 24 extending laterally from the head and being disposed on opposite sides thereof. As best seen in Figure 3, the ears 22 and 24 are set at opposite angles with respect to each other and thereby causes the lure to revolve when pulled through the water. In effect, the ears 22 and 24 are the propelling means whereby rotation is imparted to the lure. It will now be seen that the blank 10 may be stamped in one operation to form a body member 16 comprising a shank and a head.

Figure 1:
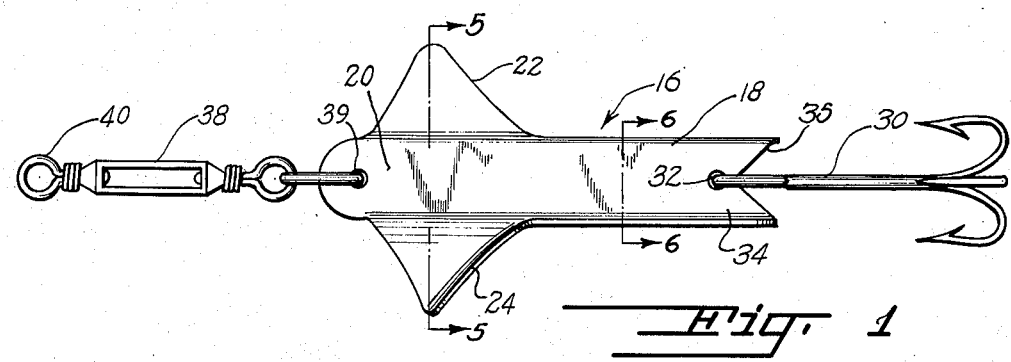
Figure 1 is a top plan view of the spinning lure embodying this invention.
Figure 6:
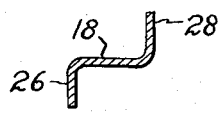
Figure 6 is a cross sectional view taken on line 6—6 of Figure 1.

The shank 18 has at the longitudinal edges arcuately shaped fins 26 and 28 similar to each other and disposed symmetrically. The shank 18 together with the fins 26 and 28 are Z-shaped in cross section (Figure 6). The peripheral shape of each of the fins takes the form of a fish tail so that the flow of water about the lure as it is pulled through the water does not allow the bait to travel from side to side, as viewed in Figure 1. The bait (not shown) is carried on the hook 30 carried in a hole 32 adjacent the free end 34 of the shank 18. Actual experience has shown that the hook will travel only about one inch to either side, as viewed in Figure 1, thus preventing the hooks from lying at the side of the bait (not shown) when the lure is in motion or being pushed too far to one side or the other during a strike.

It will be noted that the free end 34 of shank 18 adjacent hook 30 is cut reversely to form a V-shaped notch 35 with the hole 32 adjacent the point of the V.

A ring 36 is secured in an aperture 39 provided in the head 20 of the body 16. One end of a swivel 38 is fastened to ring 36 and the other end of the swivel 38 is provided with a ring 40 adapted to be attached to a fish line (not shown).

Figure 2:
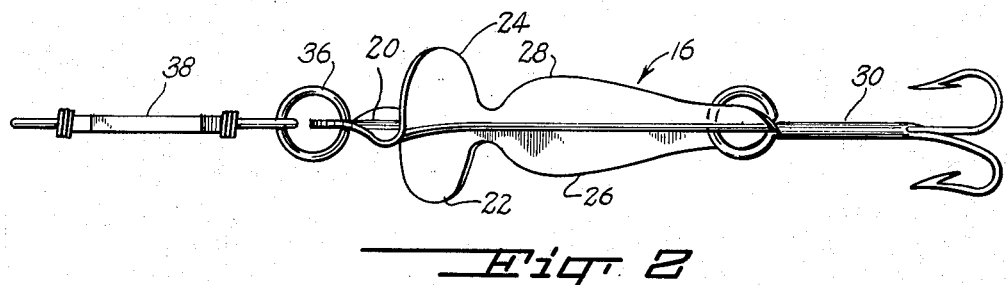
Figure 2 is a side elevational view thereof.

From the foregoing it will be evident that there has been provided a fish lure of the spinning type having arcuately shaped, symmetrically disposed fins on the shank portion of the body of the lure to prevent excessive side motion as viewed in Figure 2.

Otherwise stated, the fish lure of this invention is defined by an elongated body having a flat intermediate portion extending longitudinally thereof with one section of the intermediate portion defining the shank 18 and the other section defining the head 20. The fins 26 and 28 are carried by the intermediate body portion along opposite longitudinal edges of the shank 18 so as to extend from one end of the intermediate body portion to a location terminating at the other end or head 20 thereof and project from the shank 18 in opposite directions substantially perpendicularly thereto. The head 20 carries the ears 22 and 24 along opposite longitudinal edges thereof.

While there are shown and described the preferred embodiment of the invention, it is to be understood that the structure is susceptible to change and modification within the practicability of the invention and therefore should be limited only by the scope of the claim appended hereto.

What is claimed is:

A one-piece lure of the spinner type comprising an elongated main body having parallel longitudinal edges and including a flat intermediate portion extending longitudinally thereof, said intermediate portion defining an elongated shank and a head, a pair of similar symmetrically formed fins carried by said shank, each of said fins being disposed along an opposite longitudinal edge of said shank and projecting perpendicularly therefrom with the fins disposed in opposite directions and terminating at one end at said head, each of said fins being arcuately shaped along its outer periphery, and a pair of ears extending laterally from said head and being disposed on opposite sides thereof, said ears being disposed at opposite angles with respect to each other to impart rotation to the lure as it is being drawn through the water.

References Cited in the file of this patent

UNITED STATES PATENTS

| | | |
|---|---|---|
| D. 153,676 | Gardemeyer | May 10, 1949 |
| 760,028 | Shulean | May 17, 1904 |
| 1,796,590 | Carlson | Mar. 17, 1931 |
| 1,893,390 | Benzick et al. | Jan. 3, 1933 |
| 1,903,558 | Taylor | Apr. 11, 1933 |
| 2,223,591 | Andersson | Dec. 3, 1940 |